United States Patent [19]
Hedman

[11] Patent Number: 6,073,616
[45] Date of Patent: *Jun. 13, 2000

[54] ARRANGEMENT AT THE INTAKE MANIFOLD OF AN INTERNAL COMBUSTION ENGINE

[75] Inventor: Rolf Hedman, Linkoping, Sweden

[73] Assignee: Valeo Engine Cooling AB, Oil Cooler Division, Linkoping, Sweden

[*] Notice: This patent issued on a continued prosecution application filed under 37 CFR 1.53(d), and is subject to the twenty year patent term provisions of 35 U.S.C. 154(a)(2).

[21] Appl. No.: 08/836,944

[22] PCT Filed: Oct. 26, 1995

[86] PCT No.: PCT/SE95/01270

§ 371 Date: May 21, 1997

§ 102(e) Date: May 21, 1997

[87] PCT Pub. No.: WO96/16260

PCT Pub. Date: May 30, 1996

[30] Foreign Application Priority Data

Nov. 24, 1994 [SE] Sweden .................................. 9404077

[51] Int. Cl.⁷ .................................................. F02B 29/04
[52] U.S. Cl. ............................................................ 123/563
[58] Field of Search .............................. 60/599; 123/540, 123/542, 563

[56] References Cited

U.S. PATENT DOCUMENTS

| 2,622,571 | 12/1952 | Fehling et al. ........................... 123/563 |
| 3,091,228 | 5/1963 | Maxwell ..................................... 60/599 |
| 4,191,148 | 3/1980 | Patel et al. . |
| 4,269,158 | 5/1981 | Berti . |
| 4,452,216 | 6/1984 | Patchen, II et al. . |
| 4,476,842 | 10/1984 | Belsanti . |
| 4,660,532 | 4/1987 | Tholen . |

FOREIGN PATENT DOCUMENTS

83/02481 7/1983 WIPO .

*Primary Examiner*—Michael Koczo
*Attorney, Agent, or Firm*—Morgan & Finnegan LLP

[57] ABSTRACT

The invention concerns an arrangement comprising an inlet manifold for an internal combustion engine. The arrangement comprises an element formed with flow ducts. It is formed with two coupling device halves which communicate with the ducts. These coupling device halves can be connected to two corresponding coupling device halves disposed on the inlet manifold. One of these halves communicates with the member for supplying air of combustion for the engine and with an engine coolant discharge pipe. The other communicates with the inlet manifold and with a feed pipe for said coolant.

4 Claims, 4 Drawing Sheets

ARRANGEMENT AT THE INTAKE MANIFOLD OF AN INTERNAL COMBUSTION ENGINE

BACKGROUND OF THE INVENTION

The present invention concerns an inlet manifold arrangement for an internal combustion engine.

The inlet manifold of an internal combustion engine, as is known, conveys the air of combustion to the engine cylinders as uniformly as possible. It is frequently desirable to use the same engine design for different types of engine, for example for a normally aspirated engine or for a turbocharged engine. However, in known engines, converting a normally aspirated engine to a turbocharged engine requires extensive modifications to the inlet manifold for adding a charging air cooler thereto for connecting a turbocharger compress the air of combustion for the engine. This compression of the air of combustion is not used effectively to increase the engine power. Compressing the air of combustion increases the amount of such air fed to the engine per cycle and. Consequently more fuel can be fed to the engine and burned. The compression of the air of combustion increases its temperature, which, as is known, causes the air to attempt to expand. To counteract the above disadvantage, i.e. warming of the compressed air, it is known to allow the compressed air of combustion to pass through a charging air cooler before the air is fed to the engine. Conventionally, such a charging air cooler is a separate unit that is connected to the engine, which usually consists of a core disposed in a casing. The coolant for the core, usually the engine coolant, flows through the casing, thereby cooling the air of combustion which passes through the core.

This type of charging air cooler is associated with a number of serious disadvantages.

One disadvantage is that it is difficult to detect whether coolant is escaping into the air of combustion.

Another disadvantage is that it is awkward to dimension the cooler, or radiator, for different types of internal combustion engines, each having different other performance levels in such situations a new casing has to be designed and built.

WO-83/02481 discloses a heat exchanger for cooling or pre-heating the air of combustion for a turbocharged internal combustion engine. The heat exchanger consists of a self-contained system comprising an element equipped with a heat-storing active medium which is connected in a heat-exchanging manner to the air of combustion. The element is usually filled with a heat-accumulating active medium, which acts as a latent accumulator at the engine operating temperature. The medium changes phase from solid to liquid when the engine power output is high and when the charging air has to be cooled. At idling or low-load, the medium changes phase in the opposite direction and heats the intake air. To connect a charging air cooler in this way, it is conventional to use the ambient air as a cooling medium or a heat-accumulating medium.

U.S. Pat. No. 4,269,158 discloses a charging air cooler for a turbocharged internal combustion engine, which cooler is to be used with the engine inlet manifold the inlet manifold is constructed such that it can be used with or without the charging air cooler. The cooler is mounted, like manner to a spacer element, between the cylinder head and the inlet manifold.

BRIEF SUMMARY OF THE INVENTION

The object of the present invention is to provide an inlet manifold arrangement an internal combustion engine which enables one engine design to be used for normally aspirated or turbocharged engines. According to the invention, this, is achieved by an inlet manifold arrangement which arrangement comprises an element constructed with ducts and formed with two coupling device halves. Said coupling device halves communicate with the ducts and are connected to two corresponding coupling device halves, said corresponding coupling device halves are disposed on the inlet manifold and wherein one of said corresponding coupling device halves communicates with a feed member for air of combustion for the engine and with a discharge pipe for the coolant thereof; and wherein the other of said corresponding coupling device halves communicates with said inlet manifold and with a feed pipe for said coolant.

In a turbocharged engine, the arrangement according to the invention is characterized in that the element constructed with ducts is an integral-type charging air cooler, i.e. the type without a casing, arranged so that the temperature of the air of combustion is adapted to the engine operating requirements by means of the engine coolant.

In a normally aspirated type engine, the arrangement according to the invention is characterized in that said element constructed with ducts has a connection for feeding air of combustion for the engine to the inlet manifold and is arranged such that it blocks the flow of coolant between the feed and discharge pipes.

The arrangement according to the invention further improves the air supply to the engine cylinders with respect to that which was hitherto possible, for all types of engine.

DETAILED DESCRIPTION OF THE INVENTION

Figure 1:
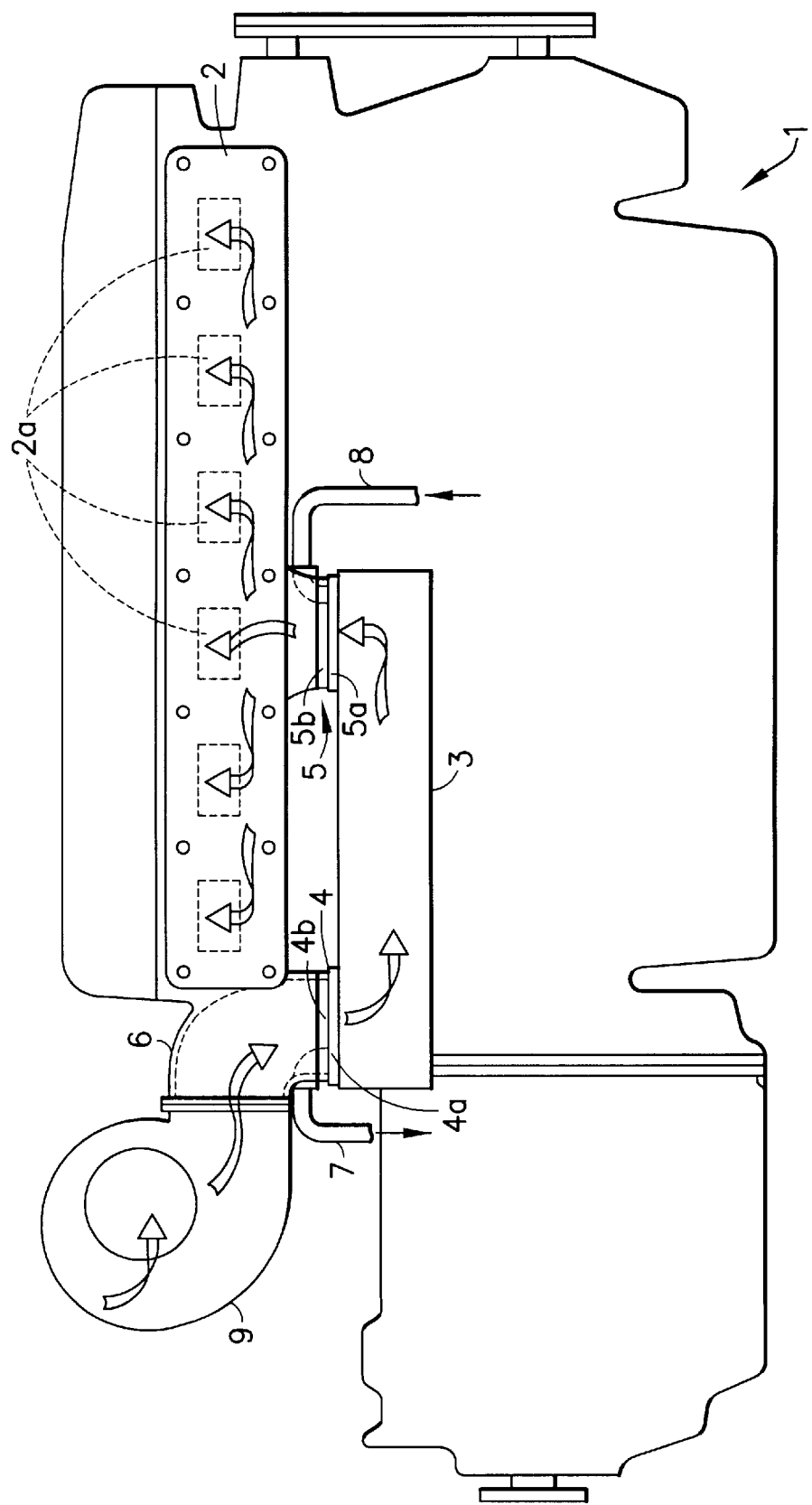
FIG. 1 shows a schematic of a turbocharged engine with a charging air cooler arranged according to the invention.

In the Figures 1 generally designates an internal combustion engine which has six cylinders, and 2 designates the engine inlet manifold. Openings 2a, which communicate with the respective cylinders of the engine 1 are; shown with dashed contours. An element 3 is formed with flow ducts and is formed with two halves 4a, 5a of coupling devices 4, 5; said halves 4a, 5a communicate with the ducts and the corresponding halves 4b, 5b of coupling devices 4, 5, are disposed on the inlet manifold 2. The coupling device half 4b is mounted at one end of a duct 6, which is mounted on the inlet manifold 2.

The coupling device half 4b is connected to the duct 6 and to an engine coolant discharge pipe 7, such that the connections do not communicate with one another but communicate with respective flow ducts of the element 3 via the coupling device half 4a. In corresponding manner, the coupling device half 5b is connected to the inlet manifold 2 and to a feed pipe 8 for coolant of the engine 1. Said connections do not communicate with one another but communicate with respective flow ducts of the element 3 via the coupling half 5a.

FIG. 1, which shows an engine fed by a turbo assembly 9, illustrates a flow path for air of combustion of the engine 1 from the turbo assembly 9 via the duct 6, the coupling device 4, the air duct of the element 3, the coupling device 5 and the inlet manifold 2 to the openings 2a. Arranged in a corresponding manner is a flow path for coolant of the engine 1 from the feed pipe 8 with the coupling device 5, the coolant duct of the element 3, the coupling device 4 and the discharge pipe 7. In a known manner, the object of the turbo assembly 9 is to compress the air of combustion in order to provide a greater amount of air for the engine per cycle. During compression, the air of combustion is heated and, in order to utilize the advantage attained by compression, the air of combustion has to be cooled before it reaches the inlet manifold 2.

The element 3, in this case, serves as a charging air cooler and, is of the so-called integral type, i.e. the type without a casing. With this construction, there is practically no risk of the coolant passing into the air of combustion. It will be appreciated that, with the construction and installation of the charging air cooler, in accordance with the invention, said cooler can easily be dimensioned to suit the particular engine requirements.

Figure 2:
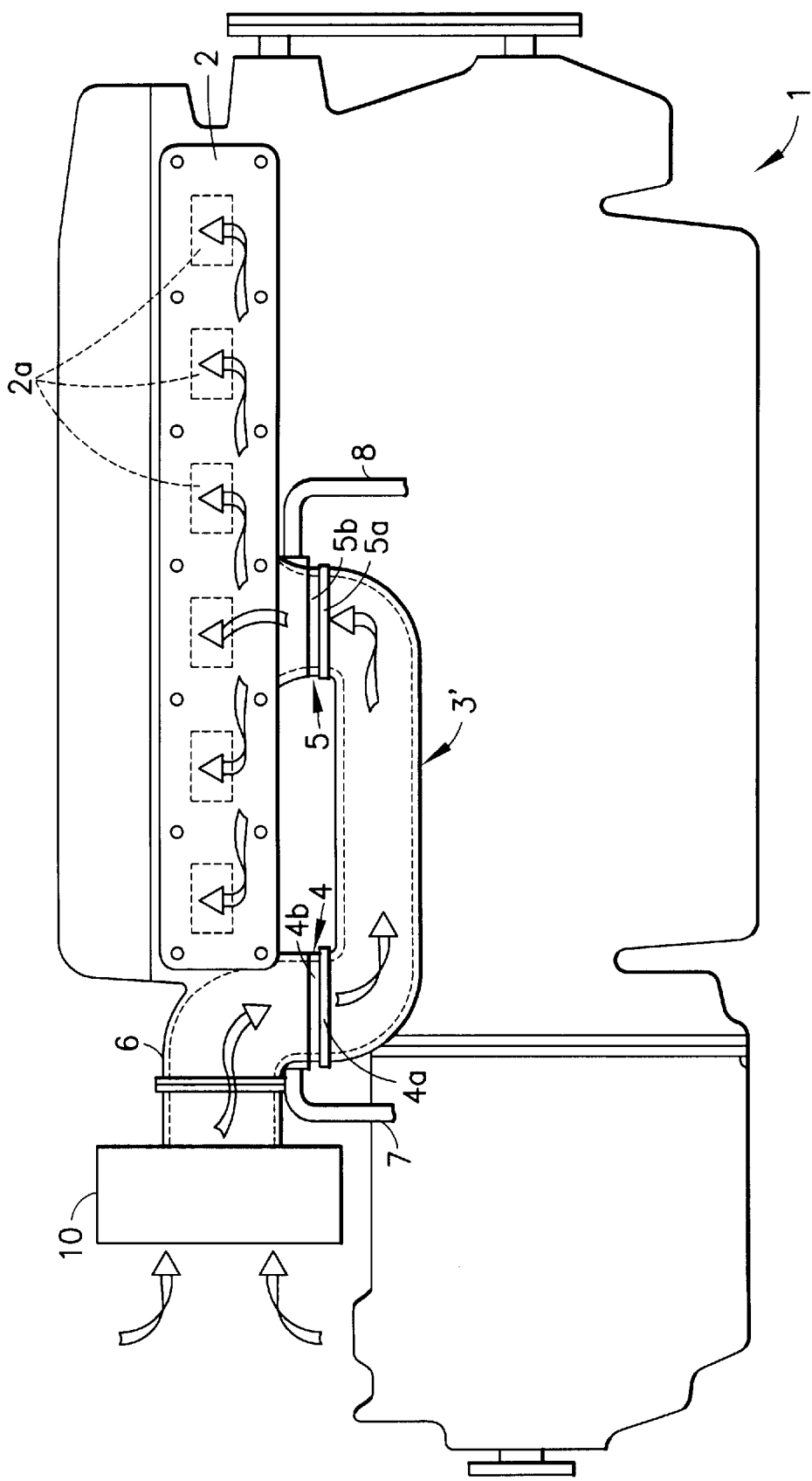
FIGS. 2 and 3 show the engine in FIG. 1 as a normally aspirated engine and a turbocharged engine, respectively, with a through-flow pipe.

In FIG. 2, where appropriate, the same reference numerals are used as in FIG. 1. FIG. 2 shows, an embodiment of the invention used in the case of a normally aspirated engine. In FIG. 2, air filter 10 is connected to the duct 6 in place of the turbo assembly 9, of FIG. 1. In this case, the element 3, according to the invention, is a through-flow pipe 3' which allows the air of combustion of the engine 1 to flow from the air filter 10 to the inlet manifold 2 but is arranged so as to block the flow of coolant between the feed and discharge pipes 8 and 7, respectively.

Figure 3:
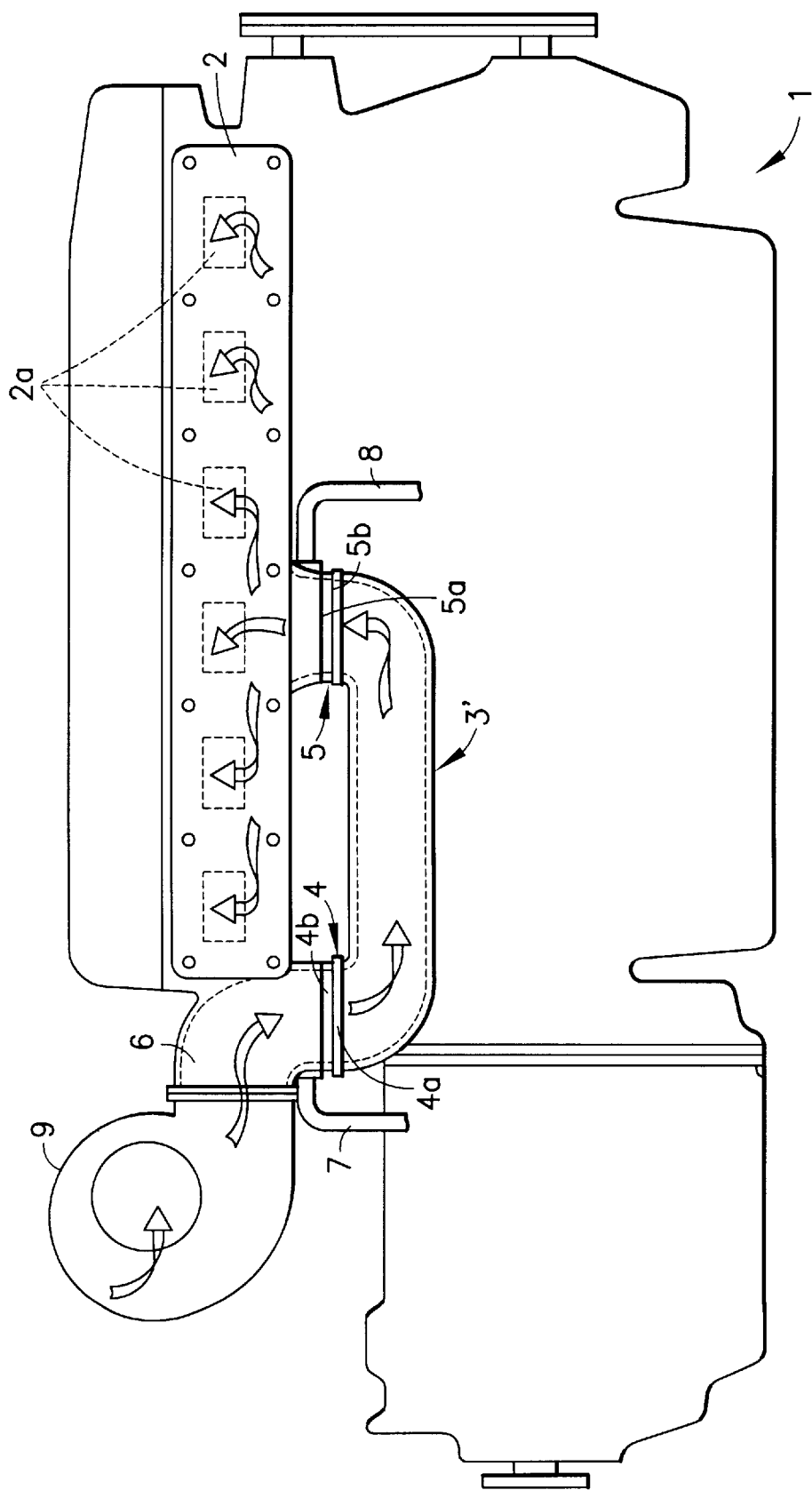

In FIG. 3, which shows a turbocharged engine, the unit according to the invention is a through-flow pipe 3' as in FIG. 2, but a turbo assembly 9 is connected to the duct 5, as in FIG. 1.

Figure 4:
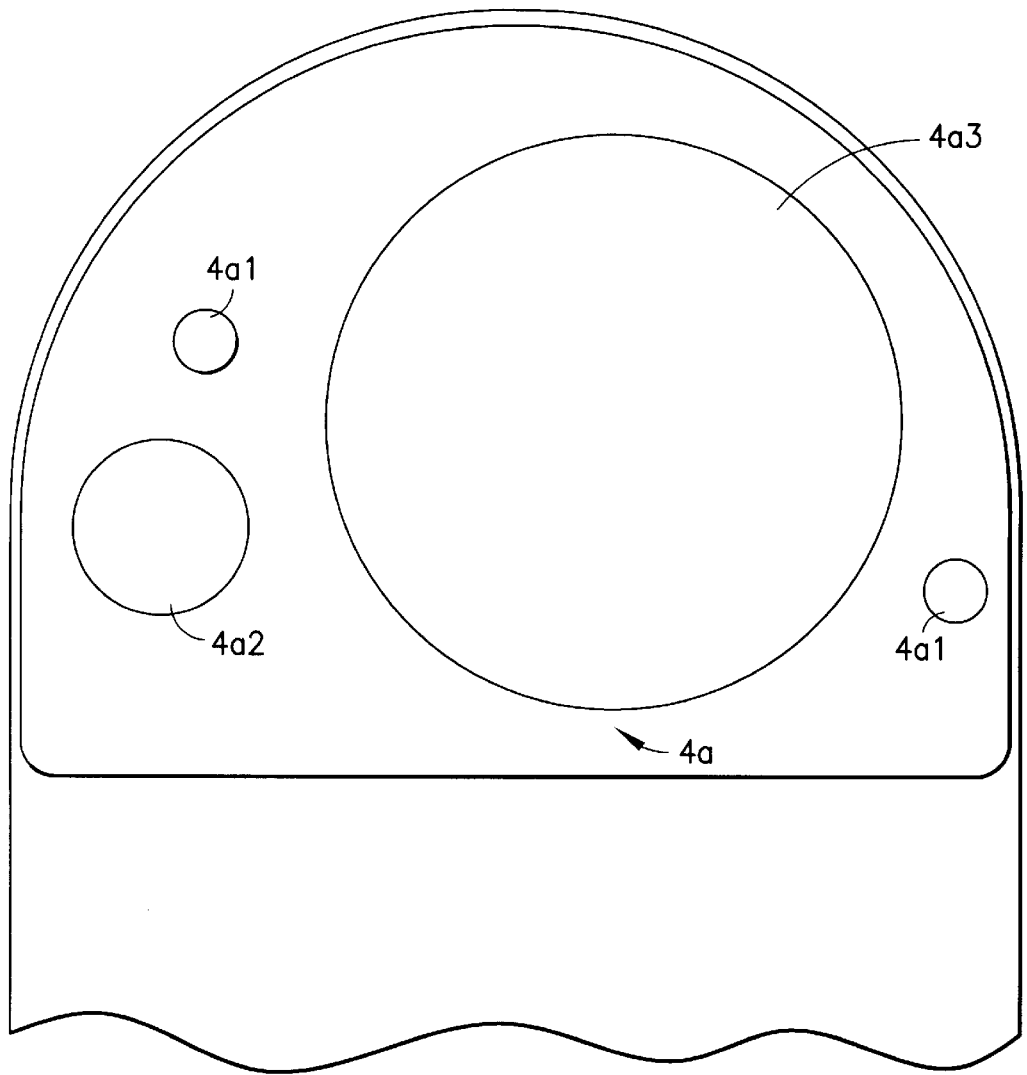
FIG. 4 shows a plan view of an embodiment of a coupling device half according to the invention.

The coupling device half shown in plan view in FIG. 4 is, for example, the part designated 4a in FIG. 1. Evidently the other coupling device halves are suitably of similar but reversed construction so that they can fit together. The coupling device half 4a has, two continuous bolt holes 4a1 for mounting the element 3 with the duct 6 via its coupling device half 4b and, two continuous openings 4a2, 4a3. The opening 4a2 communicates with the discharge pipe 7 while the opening 4a3 communicates with the duct 6. A person skilled in the art will readily see that sealing elements such as O-rings have been omitted. Further, as is known in the art, thermostatic valves, sealing caps or valve plugs can be disposed on the openings of coupling device halves 4a and 5a, of FIG. 4, to block the flow of coolant between the feed and discharge pipes 8 and 7, respectively.

In conclusion it can be stated that the arrangement according to the invention enables the same basic engine to be used for a plurality of different engine designs having performance levels adapted to particular requirements.

What is claimed is:

1. An inlet manifold apparatus for an internal combustion engine comprising an element which is formed with flow ducts and which is formed with two coupling device halves which communicate with the ducts and which are connected to two corresponding coupling device halves which are disposed on the inlet manifold and of which one of said coupling device halves communicates with a member for feeding air of combustion for the engine and with a discharge pipe for coolant and of which the other of said coupling device halves communicates with the inlet manifold and with a feed pipe for said coolant.

2. An inlet manifold apparatus according to claim 1, wherein said member for feeding air of combustion for the engine comprises a turbocharger, and wherein the element formed with flow ducts is an integral-type charging air cooler arranged so that the temperature of the air of combustion is adapted to the operating requirements of the engine by means of said coolant.

3. An inlet manifold apparatus according to claim 1, wherein the engine is of the normally aspirated type, and wherein the element formed with flow ducts has a through-flow pipe for supplying air of combustion for the engine to the inlet manifold and is arranged such that it blocks the flow of coolant between the feed and discharge pipes, respectively.

4. A system according to claim 2 wherein the element formed with flow ducts has no casing.

* * * * *